Patented June 10, 1930

1,762,153

UNITED STATES PATENT OFFICE

ARTHUR BIDDLE, OF TRENTON, NEW JERSEY, ASSIGNOR TO UNITED PRODUCTS CORPORATION OF AMERICA, A CORPORATION OF DELAWARE

METHOD OF TREATING AQUEOUSLY-DISPERSED COLLOIDAL SUBSTANCES

No Drawing.   Application filed November 4, 1926. Serial No. 146,288.

This invention relates to the alkaline treatment of aqueous colloidal substances.

I have previously invented methods for aqueously dispersing inaqueous substances such as artificial or synthetic or natural resins, cellulose products, rubber or chicle, with or without the various hydrophilic colloids such as casein, water soluble gums, starches, resin and oil soaps, soluble silicates and saponin. In such dispersing processes an alkali is often used either to dissolve the hydrophilic colloid or to make the dispersion more stable or, as in the case of a natural aqueous sap, such as rubber latex, to assist in preventing premature coagulation. The alkali which has most commonly been used is ammonia.

I have discovered, however, that if the natural aqueous sap or the artificial aqueous dispersion of the inaqueous colloid, either of which may or may not be combined with a hydrophilic colloid, be treated with the alkali while the latter is in its nascent or formative stage, the desired action of the alkali upon the dispersing mediums or the dispersions is not only facilitated but also that a superior resultant product is obtained.

In bringing the alkali to the desired formative stage lime is mixed with reagents such as water soluble carbonates or bicarbonates, water soluble alkaline sulfites or sulfides; water soluble oxalates or water soluble fluorides or tungstates and preferably the potassium or sodium salts of the reagents. In the union or combination of calcium oxide or its hydrated product, commonly known as lime, with one or more of the above mentioned reagents, a strong active hydroxide is produced in its fresh, pure and formative stage. The fresh, pure, formative or nascent stage of the lime and its reagent comprehends not only their initial combination but also every stage in which the alkaline properties are preserved without material deterioration. This new alkaline composition acts upon the aqueous colloidal substances or their aqueous dispersions and gives a product of distinctive characteristics and one not obtainable by the same agents when used alone or in other than the formative stage. The lime and its reagent may in many instances be mixed in a dry state and then added to the hydrophilic colloid or to the inaqueous colloidal substance, or the lime and its reagent may be added thereto separately, and the water subsequently added. Or the chemical reaction may be brought about by first adding water to the lime and its reagent, then adding the aqueous solution thus formed while fresh to the aqueous dispersion of the inaqueous colloids, or said aqueous solution may be added to the hydrophilic colloids and allowed to react therewith. The solution of hydrophilic colloids thus formed may then be used as the aqueous, dispersing or supporting medium for the inaqueous colloids whether in natural or artificial dispersion. Where the hydrophilic colloids are water soluble resin or oil soaps, the combination of the lime with its reacting agent may be used in the manufacture of the soap or in the saponification process, it having been found that soaps so made make very good hydrophilic colloids to be subsequently used as supporting or dispersing mediums for the inaqueous colloids.

The proportion of the lime to the reagent depends, among other things, upon the strength of the lime, which varies greatly, and the purity of the reagent. However, the amount of reagent to a given amount of lime may be ascertained by the respective atomic weights. In some instances it is desirable that either the lime or its reagent be in excess of their reacting weights and where there is an excess of lime there is generally formed an insoluble calcium compound with the inaqueous or hydrophilic colloid.

Where the reagent for the lime contains sulphur, such as potassium sulfide or sodium sulfite, there is not only a sodium hydroxide formed in the nascent stage but there is also a sulfide or sulfite of calcium formed which makes possible the intimate mixing of sulphur in an atomic state with aqueously dispersed rubber.

As examples of useful compositions made by my invention, I give the following:

| | Parts by weight |
|---|---|
| Starch | 10 |
| Lime | 1 |
| Sodium fluoride | ½ |
| Water | 100 |
| Rosin (melted or dissolved) | 10 |

The foregoing is an example of an inaqueous colloid dispersed in a hydrophilic colloid. In this instance the lime and sodium fluoride may be mixed with the starch and the water subsequently added or the lime and sodium fluoride may be first put in solution and the fresh solution then added to the starch. Enough cold water may be first added to the mixture to form a paste, the remaining water being added immediately thereafter or during the dispersing of the melted or dissolved rosin in the starch solution. The treatment of the starch by the lime and sodium fluoride solution may be accelerated by heat if desired.

| | Parts by weight |
|---|---|
| Rubber latex | 10 |
| Lime | ½ |
| Potassium or ammonium sulfide | ¼ |

The foregoing is an example of a natural aqueous dispersion of an inaqueous colloid subjected to the action of an alkaline solution in accordance with my invention. In this instance the lime and the potassium or ammonium sulfide are preferably put into solution before being added to the latex, it being understood, of course, that the addition is made while the solution is in fresh condition.

Oils, waxes, tars, etc., filling materials well known in the art such as zinc oxide, whiting, clays, lamp black, comminuted fibrous materials such as cork, sawdust, asbestos, may be added when desired to compositions made in accordance with my invention to adapt them for particular uses.

It is sometimes desirable that insolubilizing agents be added to the composition to make the hydrophilic colloids when used, insoluble in water after the water has been removed from the composition. Said insolubilizing compounds may selectively insolubilize the hydrophilic colloids only and may be formaldehyde, hexamethylene tetramine, potassium or sodium bichromate, tannin, zinc chloride, etc., or they may be strong acid bearing substances which not only insolubilize the hydrophilic colloid but have a coagulating effect upon the aqueously dispersed inaqueous colloidal substances. For example, zinc chloride, one-half part by weight may be in some instances advantageously added to the composition set forth on lines 9–13 above hereof for the purpose of insolubilizing the starch.

While I have hereindescribed some particular compositions embodying my invention and methods of producing the same, it is to be understood that the invention is not limited to the precise methods, ingredients or proportions mentioned.

Having thus described my invention, I claim and desire to protect by Letters Patent of the United States:

The method of treating rubber latex which comprises the addition thereto of starch which has been subjected to the action of lime and sodium fluoride and then adding an insolubilizing agent to insolubilize the starch after the water has been removed therefrom.

In witness whereof, I have hereunto set my hand this 3d day of November, 1926.

ARTHUR BIDDLE.